United States Patent

[11] 3,546,400

| [72] | Inventor | Max J. Dechantsreiter<br>Milwaukee, Wisconsin |
|---|---|---|
| [21] | Appl. No. | 788,470 |
| [22] | Filed | Jan. 2, 1969 |
| [45] | Patented | Dec. 8, 1970 |
| [73] | Assignee | Harnischfeger Corporation<br>Milwaukee, Wisconsin<br>a corporation of Wisconsin |

[54] SUPPORTING MEANS FOR FLEXIBLE MEMBERS
6 Claims, 9 Drawing Figs.

[52] U.S. Cl................................................. 191/12,
137/355.17; 174/69
[51] Int. Cl..................................................... H02g 11/00
[50] Field of Search......................................... 191/12,
12(C); 137/355.17(X); 24/125, 135, 81(CC);
248/68, 68(CB); 134/69(X)

[56] References Cited
UNITED STATES PATENTS

| 1,866,681 | 7/1932 | Taylor........................ | 191/12 |
| 2,975,807 | 3/1961 | Waninger.................... | 191/12(C)X |
| 3,098,349 | 7/1963 | Waninger.................... | 174/69(UX) |
| 3,446,159 | 5/1969 | Lawson....................... | 191/12X |

FOREIGN PATENTS

| 1,082,644 | 6/1960 | Germany..................... | 191/12 |

Primary Examiner—Arthur L. La Point
Assistant Examiner—George H. Libman
Attorney—James E. Nilles ABSTRACT: On a movable frame for handling power cables which extend between a stationary point and a vehicle movable along the direction of movement of the frame, a pair of carrier cables are provided to relieve the mechanical stress from the power cables resulting from movement of the frame, and guide means which are detachably connected to the carrier cables are provided for the power cables.

PATENTED DEC-8 1970
3,546,400
SHEET 1 OF 2
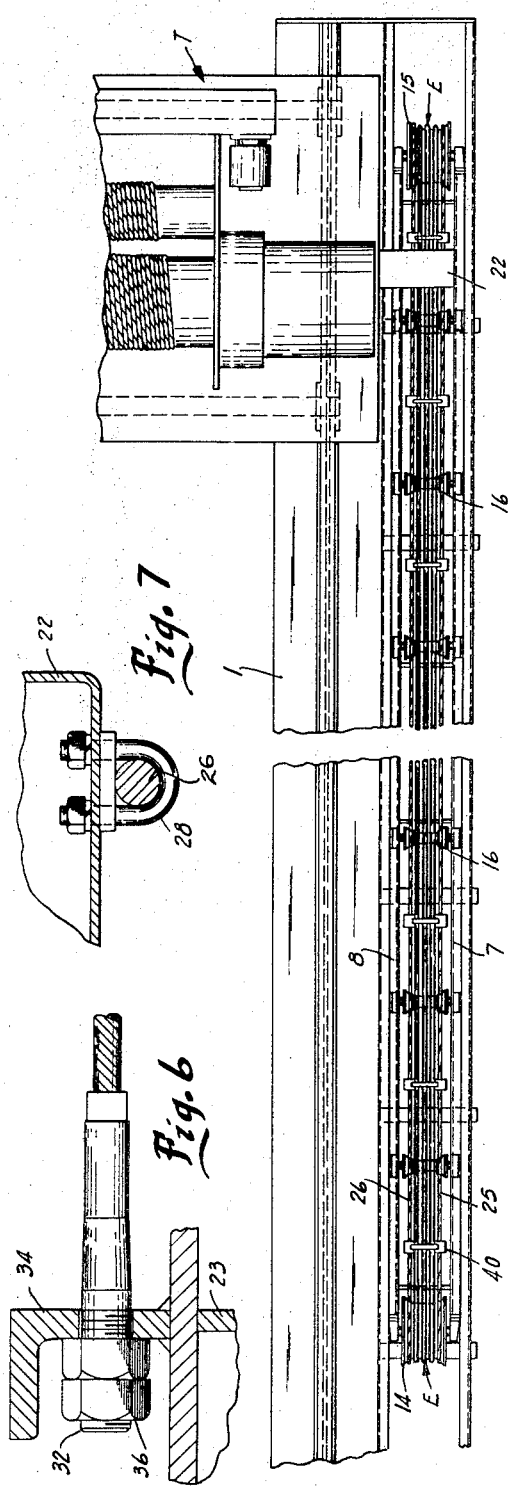
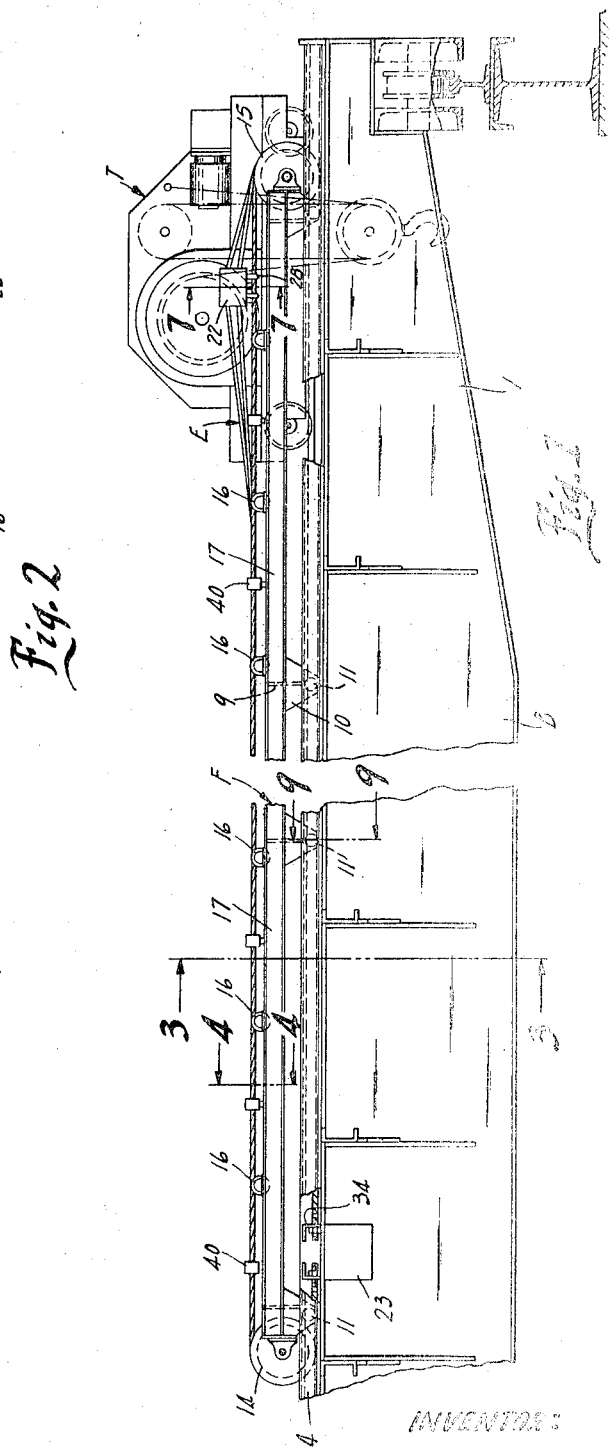
INVENTOR:
MAX J. DECHANTSREITER
BY: James E. Miller
ATTORNEY

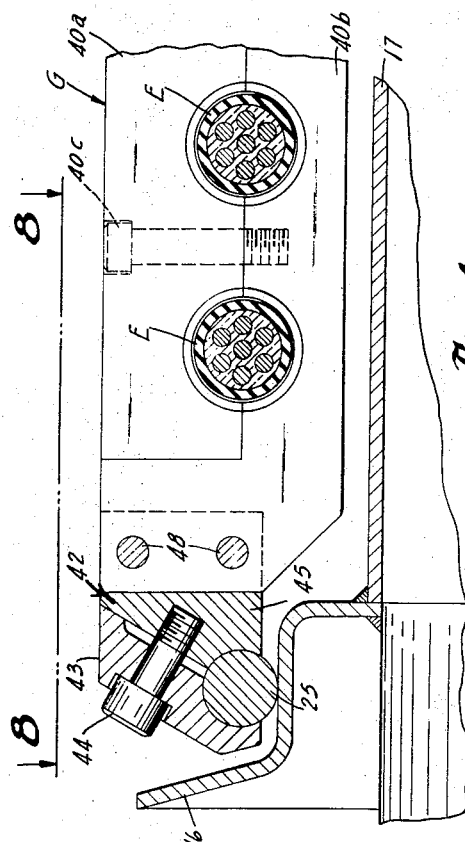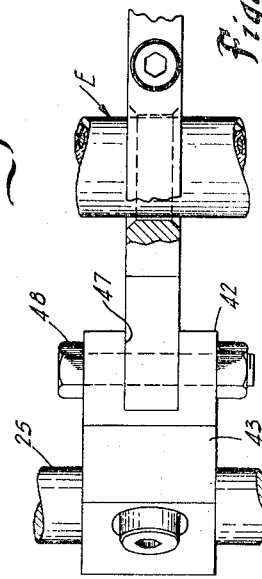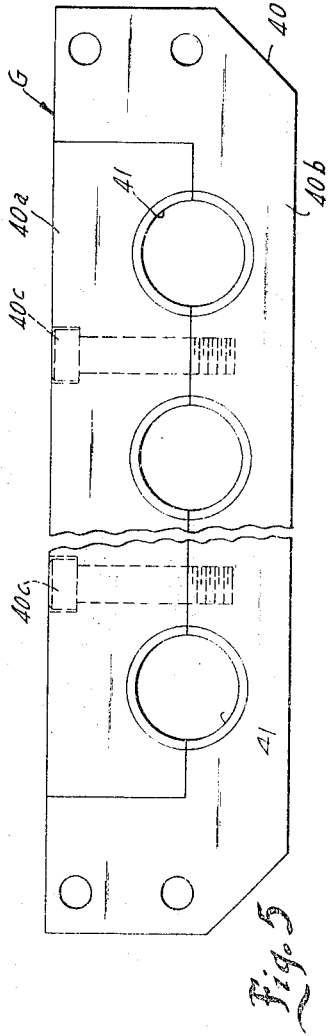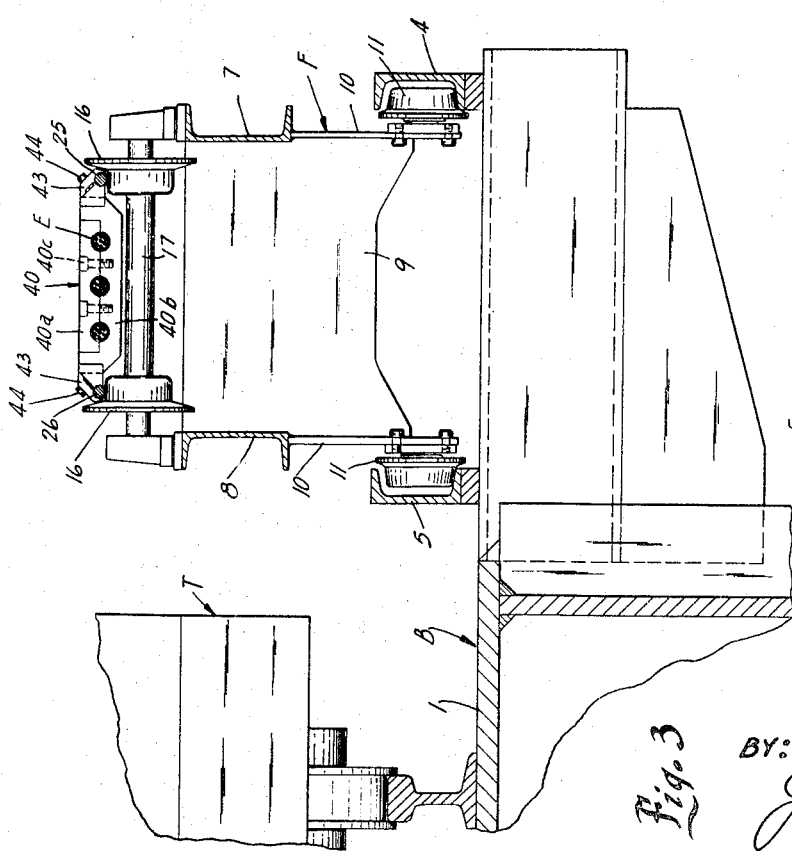

3,546,400

SUPPORTING MEANS FOR FLEXIBLE MEMBERS

BACKGROUND OF THE INVENTION

This invention pertains to supporting means for electrical cables, hydraulic hoses or the like wherein transmission of electrical power or pressure fluid, for example, must be made from a moving part to a stationary part. In devices of this character, it is usual to provide a junction box on the moving part to and also a junction box on the stationary part and flexible members are then connected between the junction boxes and their length between the boxes must be supported and guided as they are moved back and forth along with the movable part.

Examples of the general type of apparatus to which this invention pertains are shown in my U.S. Pat. Nos. 3,248,487, issued Apr. 26, 1966 and entitled "Shipboard Cargo Transferring Apparatus Having an Electrical Cable Supporting Means," and in No. 3,352,432, issued Nov. 11, 1967 entitled "Crane with Cable Carrier apparatus." In the former patent prior art apparatus, the electrical cables extend only in one direction from the movable trolley, are trained over a drum, and then are connected to a fixed junction box. In that prior art device, if a great number of electrical cables are used, the arrangement becomes rather bulky in size, particularly in width, and awkward in its operation. Furthermore, it is difficult to keep the proper amount of tautness in the flexible support and the electrical cables carried thereon; this necessitates a series of bridle sheaves for resiliently loading the cable supporting drum. Furthermore, prior art devices of this character require return cables and pulleys for returning the electrical cable supporting apparatus in one direction. Generally, these prior art devices are subject to misalignment and malfunction due to the nature of the supporting means for the electrical cables.

SUMMARY

The present invention provides a novel supporting structure for flexible members that extend between a movable and a fixed part. The supporting structure includes a pair of drums which are rigidly held in spaced apart relationship on a travelling frame and which frame has wheels for guiding it in a back-and-forth motion in the direction of trolley movement. Flexible carrier cables extend from a junction box fixed on the movable part and in each direction therefrom, and these oppositely extending cable portions are then trained around their respective spaced apart drums and are then directed toward one another and secured to the junction box on the stationary part of the crane or the like, thus forming a complete loop. The arrangement is such that a substantially equal number of flexible members can extend and be supported in either direction from the junction boxes and are supported by their respective pairs of carrier cables. As the trolley or other movable part is powered back and forth on an overhead bridge or the like, the carrier cables are likewise pulled back and forth with the trolley and act to support the flexible members carried thereon. The above arrangements result in a structure of considerably narrower width than other prior art devices having an equal number of flexible members to be supported. It is unnecessary to have return wires and pulleys for the purpose of moving the cable carrier in one direction; instead the oppositely extending carrier cables of the present invention permit smooth movement of the flexible members in either direction of movement.

A more specific aspect of the present invention relates to a carrier cable device of the above type in which improved transversely extending guide members can be easily inserted in and removed from their cable clamps by means of which they are rigidly secured to the carrier cable. This feature of the invention permits considerable flexibility and fabricating power track assemblies of various widths. It also permits ready repair and replacement of the cable guides and also of the flexible members themselves.

BRIEF DESCRIPTION OF THE DRAWINGS

FIG. 1 is a side elevational view of an overhead crane embodying the present invention; certain parts being shown as broken away or in section;

FIG. 2 is a plan view of the arrangement shown in FIG. 1, certain parts being shown as broken away or in section for clarity in the drawing;

FIG. 3 is a transverse, sectional view taken along line 3-3 in FIG. 1, on an enlarged scale;

FIG. 4 is an enlarged, fragmentary detail view in section and taken generally along the line 4-4 in FIG. 1;

FIG. 5 is an enlarged, transverse elevational view showing one of the cable guides;

FIG. 6 is an enlarged, detail section showing the means for adjusting the tautness of the carrier cable, and securing the cable to the bridge;

FIG. 7 is a sectional view taken along line 7-7 in FIG. 1, but on an enlarged scale;

FIG. 8 is a view taken from line 8-8 in FIG. 4; and

FIG. 9 is a sectional, enlarged view taken along line 9-9 in FIG. 1.

DESCRIPTION OF A PREFERRED EMBODIMENT

The present invention finds considerable utility when used in overhead cranes or the like and it will be described in connection with such a crane. The invention has been shown as used with electrical cables, but it is also applicable to use with other flexible members, such as for example, hydraulic hoses.

As shown in FIGS. 1 and 2, the overhead crane includes a bridge B, which will be referred to a stationary part, and which may be conventional in nature including a pair of spaced apart girders 1 and 2 which are rigidly secured together in the known manner. A pair of inwardly facing, U-shaped channels 4 and 5 are fixed adjacent the upper surface of one of these girders and this pair of U-shaped channels form a track or guideway for the power track frame F to be presently described.

The power track frame F provided by the present invention includes a pair of outwardly facing, U-shaped channels 7 and 8 which are rigidly fixed together by crossbraces 9. Four pairs of wheel supporting gussets 10 extend downwardly from these channels and wheels 11 are rotatably journaled in the lower portion of these gussets. As shown in FIG. 3, these wheels 11 are located within the guide channels 4 and 5 and are thus positively guidingly held as they move the power track frame back and forth along the length of the bridge.

Rotatably journaled at each end of the elongated power track frame are drums 14 and 15. Also journaled at spaced locations along the upper side of the power track frame are a series of carrier cable supporting rollers 16. As shown in FIG. 2, these rollers are spaced along the upper side of each of the channels 7 and 8. More specifically, the rollers on channels 7 and 8 are in transverse alinement and each of the transversely alined rollers is secured to a shaft 17 which extend across the power track frame. The trolley T of the overhead crane is conventionally mounted for movement along the length of the bridge and is powered in either direction. This trolley can be considered the movable part of the apparatus. The trolley has an electrical junction box 22 fixed to its lower side and another electrical junction box 23 is fixed to the bridge, i.e. stationary part of the apparatus.

A pair of carrier cables 25 and 26 are secured to the stationary junction box 23 and then extend around drum 14 and over the support rollers 16 where the cables are then rigidly secured to the movable junction box 22, as for example, by U-bolt 28. This pair of carrier cables then continues past the trolley and around the other drum 15 where they reverse their direction and then have their other ends rigidly secured to the stationary junction box 23. The carrier cables could, of course, be physically separated at the junction box 22, and their ends fixed thereto by means other than U-bolts. In any event, these cables, in effect, extend in either direction from each of the junction boxes, approximately one-half of the total number of electrical cables E used with the crane also extending in each direction from the junction boxes.

The tautness of these carrier cables is adjusted by the threaded studs 33 which are fixed to the ends of the cables, and which studs extend through a rigid bracket 34 fixed to the ends bridge B, adjacent a junction box 23. By tightening the nuts 36 on the studs, the cables can be drawn up taut and thus, held in the adjusted position. This one adjustment is all that is necessary to properly set up the cable carrier apparatus on the frame F, and it is unnecessary to use any floating sheaves, bridles, or other apparatus.

It will also be noted that there is no necessity for any mechanism to return the cables in one direction, because the carrier cable extends in each direction of the trolley and is properly moved in either direction as the trolley itself moves.

The means for supporting the electrical cables E on the carrier cables takes the form of transversely positioned cable guides G which extend between the pairs of cables and are rigidly and removably fixed thereto at spaced locations along the length of the cables. These guides include a central plate 40 which has a series of holes 41 extending therethrough for reception of the electrical cables E. These plates provide exceptional rigidity and are secured, by novel means to be described, to the cable clamp 42. The cable clamp includes a removable portion 43 which is secured by cap screw 44 to the portion 45 of the clamp. As clearly shown FIG. 4, the carrier cable is thus clamped between the parts 43 and 45 and the entire cable guide G can be easily removed from the carrier cable by simply loosening the cap bolts 44.

Referring again to the means for fastening the plates 40 to the cable clamp, it will be noted the cable clamps have a slot 47 into which the ends of the plates 40 are adapted to slip. Bolt means 48 are movably secured through the plates 40 and the cable clamps. In this manner, plates of various lengths can be utilized with common cable clamps. Furthermore, broken or bent plates can be easily replaced in the clamps and the number of spacing of the cable guides G along the length of the cables can be readily made.

The cable guide is so fabricated that the electrical cables themselves can be easily removed from or additional electrical cables added to the guides. This is accomplished by making the upper portion 40a of the plate 40 as a separate piece from the lower portion 40b. The parting line between upper portion 40a and lower portion 40b being along the centerline of the holes 41 passing through the cable guide. The upper portion 40a is rigidly, but detachably secured to the lower portion 40b by means of the cap screws 40c. In this manner, the cables may be removed from or replaced in the cable guide without any additional disassembly of the cable guide.

Referring to FIGS. 3 and 4, it should also be noted that the centerline of the flexible members E and the carrier cables 25 are located in a straight line. By having all of the cables on the same centerline, when they travel around the drums 14 and 15, relative sliding movement between the guides and cables E is avoided, thus avoiding wear on the outer jacket of the cables.

RESUME

By means of the present invention, a rigid power track frame supports a pair of spaced-apart drums, one adjacent each end of the frame. A pair of carrier cables extends from a fixed box on the stationary part of the apparatus and this pair of cables extends around the drums at each end of the frame. The other ends of the cables are then secured to the movable box. In this manner, movement of the movable box, along with its trolley for example, causes the carrier cables to move positively and upper proper tension in either direction of trolley movement. Similarly, the flexible members supported by the carrier cables also move positively in each direction and without being subjected to any tension.

I claim:
1. An overhead crane having a bridge, a trolley supported and movable along a path on said bridge, a junction box on said trolley; a junction box on said bridge; an elongated power track frame movable on said bridge and in the same direction as said trolley, said frame being located between and relative to both said junction boxes, wheel means on and for supporting said frame in its movement along said bridge, a drum journaled adjacent each end of said elongated frame, a pair of flexible carrier cables extend in both directions from each of said junction boxes, a cable guide means extending transversely between and secured to said pair of cables and at spaced locations along the length of said cables for supporting flexible electrical cables which extend from and between said junction boxes, said cable guide means comprising a central plate having holes through which said electrical cables extend, and a releasable cable clamp at each end of said plate detachably connecting said guide means to said carrier cables.

2. The combination set forth in claim 1 wherein said clamps define a slot and said plate ends are removably secured in said slots.

3. The arrangement as described in claim 1 further characterized in that said plate ends are formed in two pieces detachably secured together, the juncture of said two pieces including said holes whereby said electrical cables can be removed from said plates by separating said pieces and without removing said clamps from said carrier cables.

4. A power loop system for feeding flexible cables between a stationary and a movable member comprising, a junction box on the stationary member; a junction box on the movable member; an elongated power track frame reciprocally movable between and relative to both said junction boxes, wheel means on and for supporting said frame in its movement, a drum journaled about a horizontal axis and adjacent each end of said elongated frame, a pair of flexible carrier cables secured to both of said junction boxes and trained around each of said drums, cables and at spaced locations along the length of said cables for supporting electrical cables which extend from and between said junction boxes, said cable guide means comprising a central plate having holes through which said electrical cables extend, and a releasable cable clamp at each end of said plate detachably connecting said guide means to said carrier cables.

5. The combination set forth in claim 4 wherein said clamps define a slot and said plate ends are removably secured in said slots.

6. The arrangement as described in claim 4 further characterized in that said plates are formed in two pieces detachably secured together, the juncture of said two pieces including said holes whereby said electrical cables can be removed from said plates by separating said pieces and without removing said clamps from said carrier cables.